US005143290A

United States Patent [19]

Wang

[11] Patent Number: 5,143,290

[45] Date of Patent: Sep. 1, 1992

[54] SINGLE-SPRINKLER CONTROLLER

[76] Inventor: Po H. Wang, No. 91, Kuotai Rd., Chunan Chen, Miaoli Hsien, Taiwan

[21] Appl. No.: 728,590

[22] Filed: Jul. 11, 1991

[51] Int. Cl.[5] ...................... B05B 12/02; A01G 27/00

[52] U.S. Cl. ................................ 239/70; 137/624.15; 251/30.03

[58] Field of Search ............... 239/69, 70; 137/624.13, 137/624.15, 624.22; 251/30.03, 38, 45

[56] References Cited

U.S. PATENT DOCUMENTS

| | | | |
|---|---|---|---|
| 2,982,307 | 5/1961 | Mueller | 137/624.15 |
| 3,708,068 | 1/1973 | Tischler | 137/624.15 |
| 3,976,101 | 8/1976 | Bassett | 137/624.2 |
| 4,592,505 | 6/1986 | Bruninga et al. | 239/69 |
| 4,797,820 | 1/1989 | Wilson et al. | 239/69 |
| 4,860,990 | 8/1989 | Fukuzawa et al. | 251/30.03 |

*Primary Examiner*—Andres Kashnikow
*Assistant Examiner*—Karen B. Merritt

[57] ABSTRACT

A single-sprinkler controller comprises a timer for the input of data of sprinkling time for the sprinkler, a motor electrically connected to and operatively controlled by the timer based on the data, a rotor disc with two ridges mounted on a first shaft rotatably mounted on a mount wall and drivable by the motor, a pivot member pivotably mounted to a mount wall, and a valve assembly. The valve assembly includes an enclosure with a chamber having a first open side mounted to and sealed by the mount wall and a second open side, an inlet conduit having a first inlet in fluid communication with a water supply provided outside the enclosure and a first outlet provided in the chamber, an outlet conduit having a second inlet in the first outlet and a second outlet in fluid communication to the sprinkler, a rear cover mounted to and sealing the second open side of the chamber, and a valve membrane provided in the chamber. The valve membrane is initially in a first status when neither of the ridges contact the pivot member, such that the inlet conduit is not in fluid communication with the outlet conduit, and the valve membrane is in a second status when one of said ridges contacts and urges the pivot member, such that the inlet conduit is in fluid communication with the outlet conduit.

5 Claims, 5 Drawing Sheets

SINGLE-SPRINKLER CONTROLLER

BACKGROUND OF THE INVENTION

This invention relates to an automated sprinkler, and, more particularly, to a timer which coordinates the operation of a single sprinkler.

Multi-sprinkler controllers have been widely used to supply water to lawns of large area. For example, applicant's U.S. Pat. Application Ser. Nos. 07/548,281, now abandoned, and 07/683,232 disclose multi-sprinkler controllers to provide an automatic operation for water discharge in which a timer is utilized to control the opening and closing of several sprinklers. However, such multi-sprinkler controllers are too complicated for controlling the water supply to a small lawn.

The present invention provides a single-sprinkler controller modified from the above-mentioned multi-sprinkler controllers to control the water supply to a small lawn.

SUMMARY OF THE INVENTION

It is a primary object of this invention to provide a single-sprinkler controller to control a water supply to a small lawn.

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
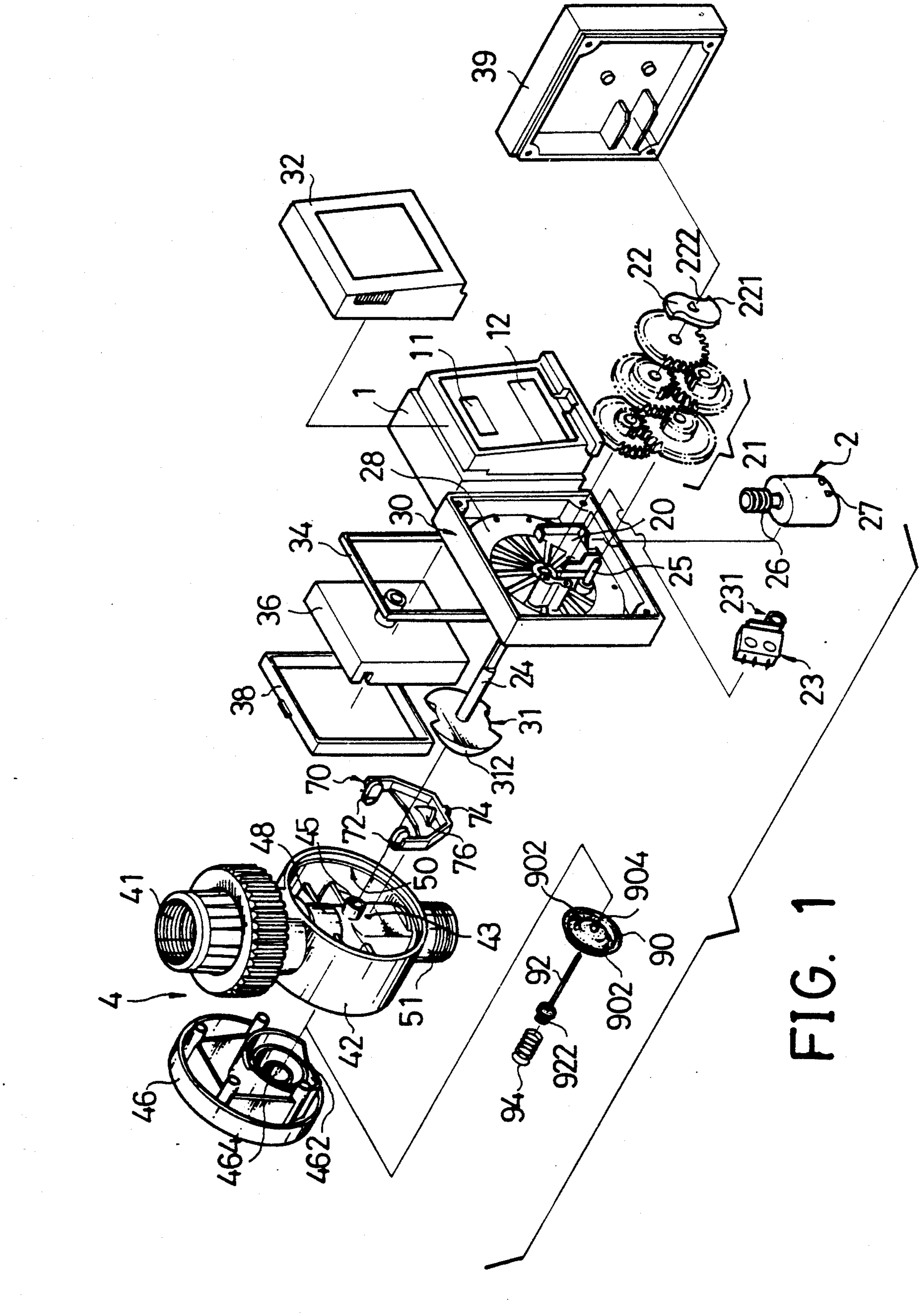
FIG. 1 is an exploded perspective view of a single-sprinkler controller in accordance with the present invention.

With reference to the drawings and initially to FIG. 1, a single-sprinkler controller in accordance with the present invention comprises a timer 1, a motor 2 operatively controlled by the timer 1 and mounted within a motor seat 20, and a valve assembly 4.

The timer 1 is of a well-known means and, therefore, shall not be described in detail. The timer 1 preferably includes an LED or LCD display area 11 numerated in hours and minutes, as well as in months and days. The display area 11 can also display how long the sprinkler is set to sprinkle. The timer 1 also includes an input means 12 for setting the appropriate day of the month and hour of the day at which the sprinkler should turn on and then turn off, for either automatic or manual regulation of the sprinkler, for setting the clock time, and for resetting an update of the desired regulation of the sprinkler system or for erasing error messages. A front cover 32, a washer 34, a back plate 36, and a rear cover 38 are provided to house the timer 1. The timer 1 is connected to a battery cell unit, external AC, or other DC power source (not shown). Such a timer 1 has been disclosed in applicant's U.S. Pat. Application Ser. Nos. 07/548,281 and 07/683,232. Further description is not required.

Still referring to FIG. 1, the motor 2 is housed in a casing 30 with a mount wall 28 adjacent to the timer 1. The motor 2 is operatively controlled by the timer 1 and is electrically connected to an input end 27 which is able to switch the motor 2 on or off by well-known means. An output end, such as a worm gear 26, of the motor 2 is engaged with a reduction gear assembly 21 mounted on a first shaft 24 and a second shaft 25. Both the first shaft 24 and the second shaft 25 are rotatably mounted on the mount wall 28. The timer 1 is so programmed that it can control the rotation of the motor 2 based on input data from the user, which will be discussed in detail later. A front cover 39 is provided on a front side of the casing 30.

The motor 2 drives the reduction gear assembly 21 which, in turn, drives the first shaft 24. The motor 2 simultaneously drives a substantially S-shaped cam 22 which is also mounted on the first shaft 24. The cam 22 has two lobe portions 221 and two recessed portions 222 between the lobe portions 221. The cam 22 activates the microswitch 23 when one of the lobe portions 221 impinges on a pressure sensitive wheel 231, acting in conjunction with the microswitch 23, to turn the motor 2 off.

Figure 2:
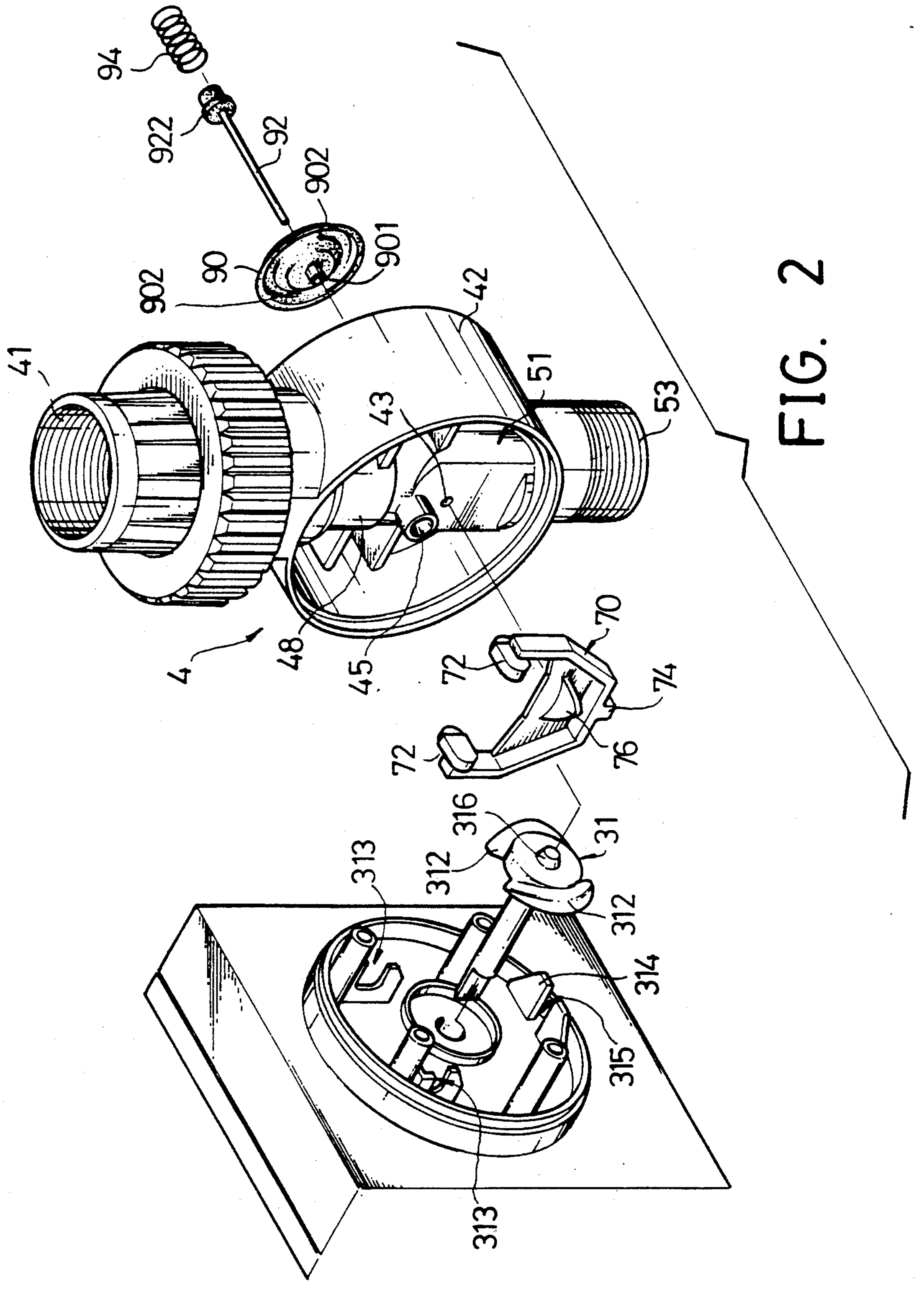
FIG. 2 is an exploded perspective view showing a pivot member which controls the opening and closing of a valve assembly of the present invention.

Still referring to FIG. 1, and further to FIG. 2, the first shaft 24 driven by the motor 2 causes a rotation in a rotor disc 31 mounted on one end of the first shaft 24 at the rear side of the mount wall 28. The position of the rotor disc 31 operatively controls the valve assembly 4 by means of two ridges 312 formed on a periphery of the rotor disc 31. The ridges 312 are in functional alignment with the lobe portions 221 of the cam 22. Each ridge 312 tapers according to the direction of rotation of the rotor disc 31.

As can be seen in FIG. 2, a pair of spaced pivot seats 313 are formed on the rear side of the mount wall 28 at an upper portion thereof. In addition, a pair of spaced plates 314 are formed on the rear side of the mount wall 28 at a lower portion thereof, defining a slot 315 therebetween. A substantially V-shaped pivot member 70 is provided to the rear side of the mount wall 28. The pivot member 70 has two pivot ends 72 which are respectively and pivotally retained in the pivot seats 313. The pivot member 70 further has a first surface facing the valve assembly 4 for controlling opening and closing of the valve assembly 4, which will be discussed in detail later. The pivot member 70 further has a first protrusion 76 protruding from a second surface thereof, facing the ridges 312, for controlling pivot movement thereof. The pivot member 70 further has a second protrusion 74 formed at a lower portion thereof to be guided in the slot 315 during pivotal movement of the pivot member 70.

Figure 3:
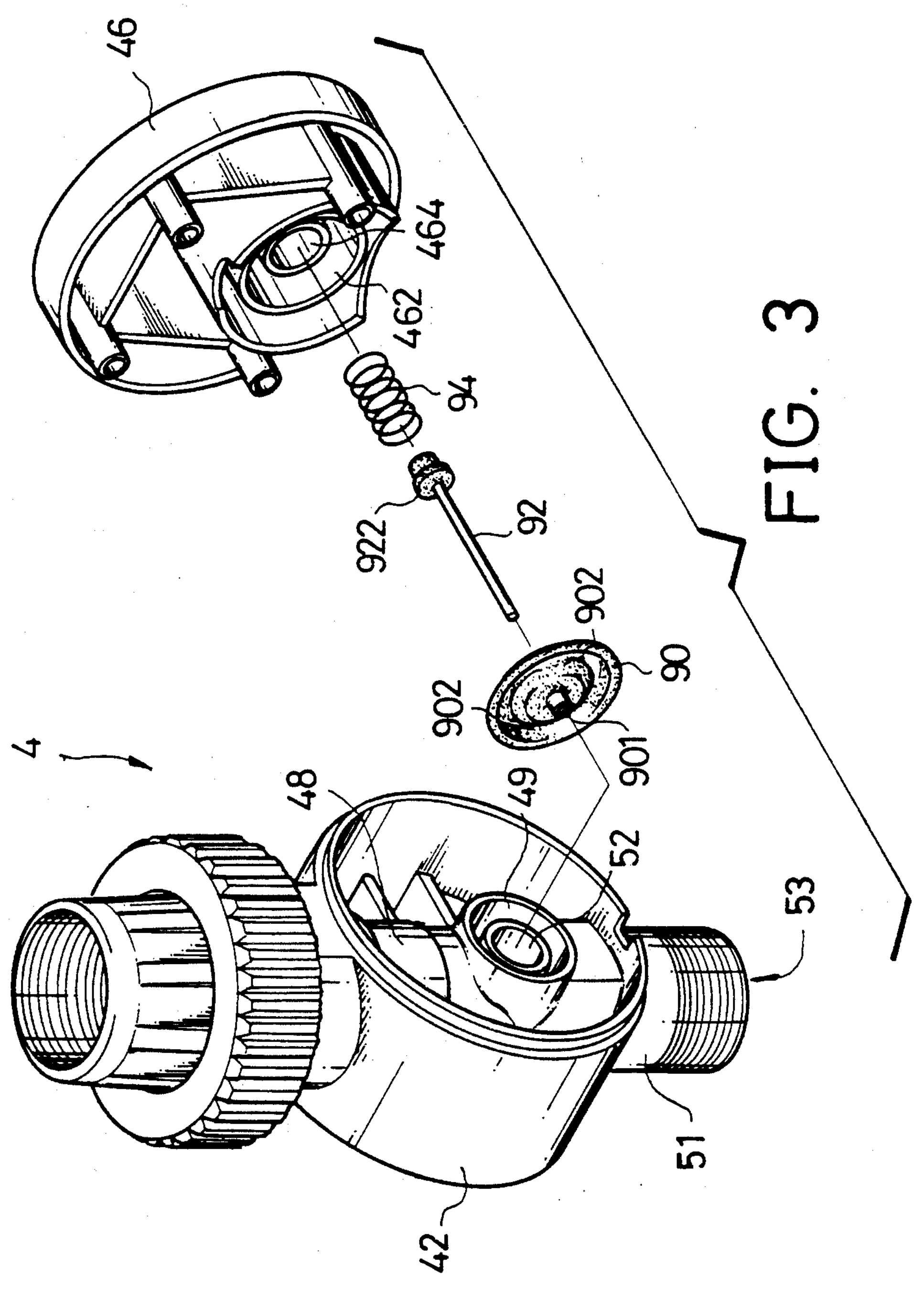
FIG. 3 is an exploded rear perspective view showing the valve assembly and water passages of the present invention.

Still referring to FIGS. 1 and 2, the valve assembly 4 has an enclosure 42 with a chamber 50, which is open at front and rear sides. The front open side of enclosure 42 is mounted to the rear side of the mount wall 28, and is thus sealed by the mount wall 28 to define thereby a front wall of the chamber 50. The rear open side of the enclosure 42 is covered and sealed by a rear cover 46, defining a rear wall of the chamber 50. As shown in FIG. 3, the valve assembly 4 has an inlet conduit 48 which has a first inlet 41 located outside the enclosure 42 in fluid communication with a water supply (not shown) and a first outlet 49 located in the chamber 50. The valve assembly 4 further has an outlet conduit 51 which has a second inlet 52 located in the chamber 50, more particularly, in the first outlet 49 of the inlet conduit 48. The outlet conduit 51 further has a second outlet 53 outside the enclosure 42 in fluid communication with the sprinkler (not shown).

Referring to FIGS. 1 through 3, the valve assembly 4 further includes a valve means comprising an annular resilient valve membrane 90, a tappet 92, and a spring 94 attached to the tappet 92. The valve membrane 90 has a central hole 901 and two diametrically disposed apertures 902. Referring to FIG. 2, a hole 43 is formed in the second inlet 52. A first end of the tappet 92 passes through the central hole 901 and the hole 43 to contact the pivot member 70, which will be discussed later. The spring 94 is attached to a second end 922 of the tappet 92 and is received in a spring seat 464 in the rear cover 46 (cf. FIGS. 4 and 5). The rear cover 46 further has a valve seat 462 for retaining the valve membrane 90. Referring to FIG. 2, a receptacle 45 is formed on an outer periphery of the conduit, facing the rotor disc 31, for receiving an end 316 of the rotor disc 31, providing a stable rotation of the rotor disc 31.

Figure 4:
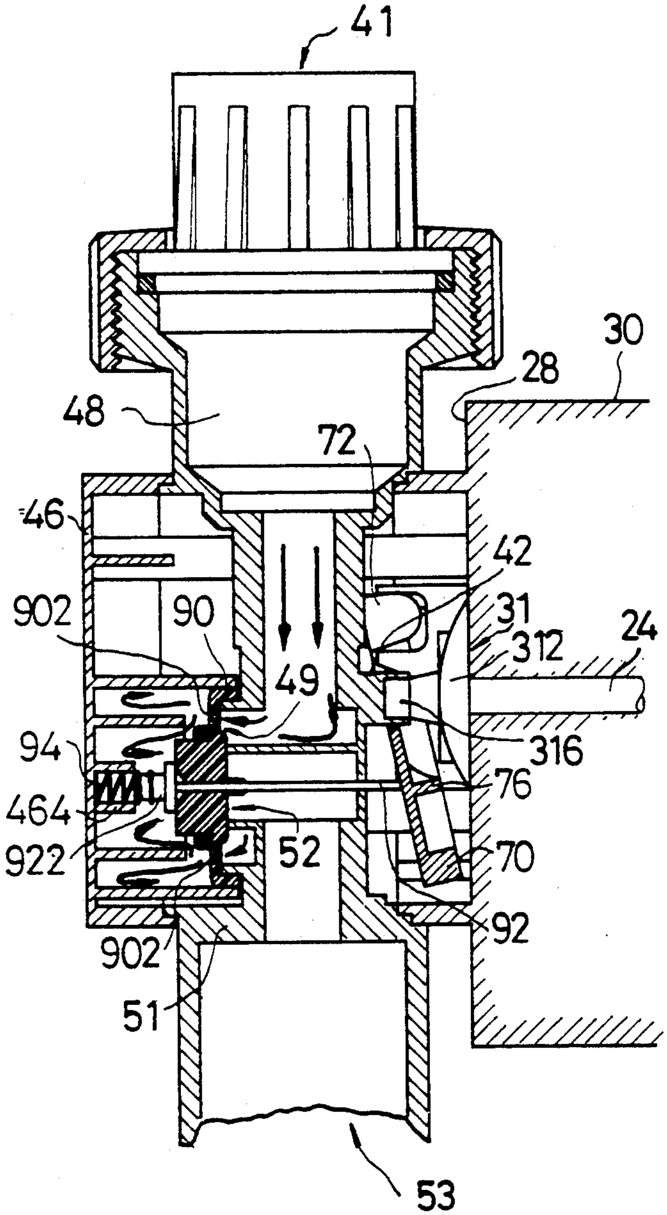
FIG. 4 is a cross-sectional view of the valve assembly of the present invention, wherein the pivot member is in a first position such that the valve assembly is closed.

In a first status, as shown in FIG. 4, the valve membrane 90 blocks the passage between the first outlet 49 of the inlet conduit 48 and the second inlet 52 of the outlet conduit 51. As indicated by arrows in FIG. 4, water from the first inlet 41 flows into the chamber 50 via the apertures 902, pressing the valve membrane 90 to further enhance blockage of the passage between the inlet and outlet conduits 48 and 51. It is noted that the spring 94 is in an uncompressed status.

Figure 5:
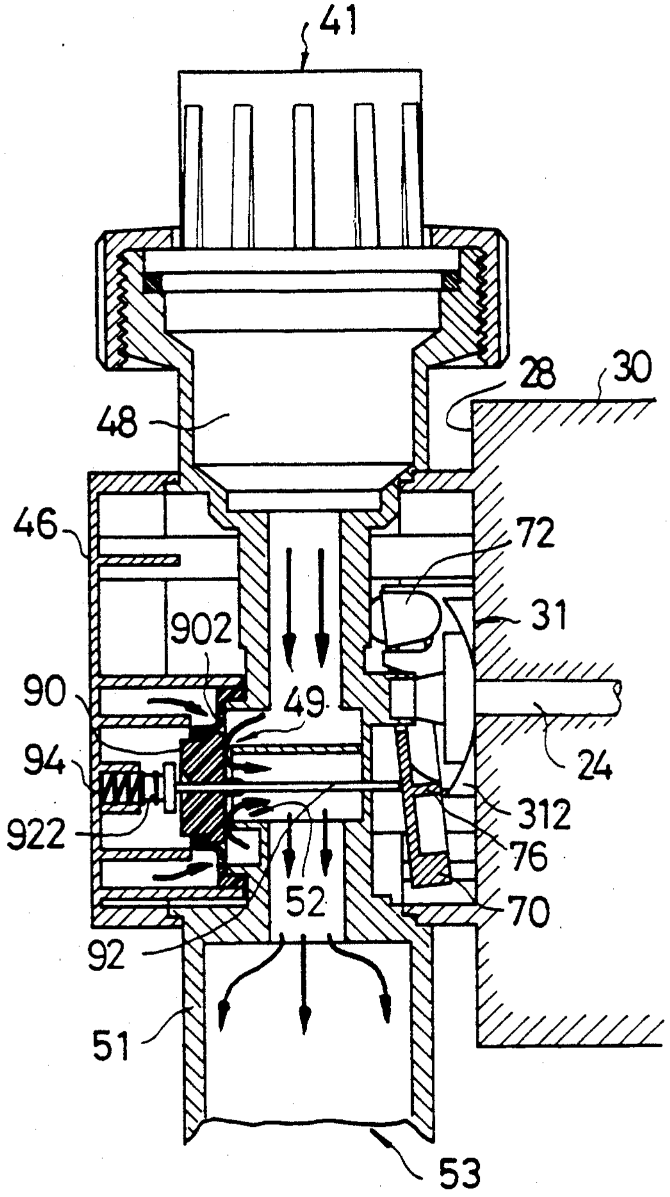
FIG. 5 is view similar to FIG. 3, wherein the pivot member is in a second position such that the valve assembly is opened.

Referring to FIG. 5, when the tappet 92 moves leftward (due to the leftward movement of the pivot member 70, which in turn is actuated by one of the ridges 312 of the rotor disc 31), the spring 94 is compressed and the valve membrane 90 is no longer restrained. As indicated by arrows in this figure, water from the first inlet 41 of the inlet conduit 48 flows through the first outlet 49, the second inlet 52, and the second outlet 53 to the sprinkler.

Operation

In automatic operation, the user may wish the sprinkler to sprinkle for five minutes at a desired time, say 9:00 a.m. on Jul. 1, 1991. The user would first input the corresponding data into the timer 1. Initially, neither of the ridges 312 of the rotor disc 31 contact the first protrusion 76 of the pivot member 70, such that no water flows into the outlet conduit 51 (cf. FIG. 4).

At a pre-set time, the timer 1 switches the motor on to rotate, say clockwise, which, in turn, rotates the cam 22 and the rotor disc 31. When the one of the ridges 312 contacts the first protrusion 76 of the pivot member 70, the pivot member 70 pivots about the pivot ends 72 in the pivot seats 313, with the second protrusion 74 moving along the slot 315. The tappet 92 is urged leftward (as seen from FIG. 5) by the first face of the pivot member 70, compressing the spring 94, and thus allowing water from the inlet conduit 48 to flow into the outlet conduit 51 (cf. FIG. 5). The associated impingement of the pressure sensitive wheel 231 of the microswitch 23 by one of the lobe portions 221 of the cam 22 causes the timer 1 to switch the motor 2 off. Accordingly, water from the first inlet 41 of the inlet conduit 48 is allowed to pass through the outlet conduit 51 to the sprinkler for five minutes.

After five minutes, the timer 1 causes the motor 2 to again rotate clockwise, which, in turn, rotates the cam 22 and the rotor disc 31, such that neither of the ridges 312 contact the first protrusion 76 as it was initially, and then shuts-off the motor.

In manual operation, a depression of the key means 12 under manual mode will cause the motor 2 to rotate, and the corresponding information is displayed on the display area 11.

As various embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. A single-sprinkler controller comprising:

a timer with input means for the input of data of sprinkling time for said sprinkler and display means for displaying said sprinkling time of said sprinkler;

a motor being housed in a casing with a mount wall, an input end of said motor being electrically connected to and operatively controlled by said timer based on said data, an output end of said motor being engaged with a reduction gear assembly mounted on a first shaft which is rotatably mounted on said mount wall, a rotor disc being mounted on said first shaft at an outer side of said casing adjacent to said mount wall, said rotor disc having a plurality of ridges formed on a surface thereof distal to said mount wall;

a cam mounted on said first shaft and a pressure sensitive wheel in connection with a microswitch, said cam having a plurality of lobe portions and recessed portions between two said lobe portions corresponding to said ridges, said ridges being in functional alignment with said lobe portions, said pressure sensitive wheel being actuated by one of said lobe portions of said cam upon a rotation of said motor to activate said microswitch which is electrically connected to said timer to switch said motor off;

a pivot member pivotably mounted to said mount wall; and a valve assembly comprising:

an enclosure with a chamber having a first open side mounted to and sealed by said mount wall and a second open side;

an inlet conduit having a first inlet in fluid communication with a water supply provided outside said enclosure and a first outlet provided in said chamber;

an outlet conduit having a second inlet in said first outlet and a second outlet in fluid communication to the sprinkler;

a rear cover mounted to and sealing said second open side of said chamber; and a valve means provided in said chamber, said valve means being initially in a first status when neither of said ridges contact said pivot member, such that said inlet conduit is not in fluid communication with said outlet conduit, and said valve means being urgeable by said pivot member to a second status when one of said ridges contacts and urges said pivot member, such that said inlet conduit is in fluid communication with said outlet conduit.

2. A single-sprinkler controller according to claim 1, wherein said rear cover has a valve seat for receiving said valve means.

3. A single-sprinkler controller according to claim 1, wherein said valve means comprises an annular resilient valve membrane, a tappet, and a spring attached to a first end of said tappet and received in a spring seat in said rear cover, a second end of said tappet passing through a central hole of said valve membrane and a hole formed in said second inlet to contact said pivot member, such that said tappet is urgeable from said first status to said second status by a pivotal movement of said pivot member when one of said ridges pivots said pivot member.

4. A single-sprinkler controller according to claim 3, wherein said annular resilient valve membrane has two apertures thereon for enhancing the blockage of a water passage between said inlet and outlet conduits.

5. A single-sprinkler controller according to claim 1, wherein a receptacle is formed on an outer periphery of one of said inlet and outlet conduits, facing said rotor disc, for receiving an end of said rotor disc, thereby providing stable rotation of said rotor disc.

* * * * *